July 1, 1924.

S. KUNO 1,499,670

FRYING PAN

Filed Nov. 12, 1923

Inventor
Shichigoro Kuno.

By A. J. O'Brien
Attorney

Patented July 1, 1924.

1,499,670

UNITED STATES PATENT OFFICE.

SHICHIGORO KUNO, OF DENVER, COLORADO.

FRYING PAN.

Application filed November 12, 1923. Serial No. 674,373.

*To all whom it may concern:*

Be it known that I, SHICHIGORO KUNO, a subject of the Emperor of Japan, residing at the city and county of Denver and State of Colorado, have invented certain new and useful Improvements in Frying Pans; and I do declare the following to be a full, clear, and exact description of the invention, such as will enable others skilled in the art to which it appertains to make and use the same, reference being had to the accompanying drawings and to the characters of reference marked thereon, which form a part of this specification.

This invention relates to improvements in frying pans.

In most up-to-date kitchens, both in private homes and in hotels and restaurants, gas is employed for cooking. In order to secure the necessary amount of heat, the gas is turned on in full force with the result that the flame spreads out over the sides of the vessel, thereby wasting a large amount of heat and often burning the hands of the cook.

It is the object of this invention to produce a frying pan that shall be so constructed that it will, to a great extent, prevent the flame from passing out beyond the sides of the pan and to confine the flame closely to the sides of the pan, whereby the heat will be transferred to the pan. It is a further object of this invention to provide the frying pan with a shield that will protect the hand from the flame.

My invention, briefly described, consists in providing the frying pan with a downwardly extending ring that is in contact with the upper edge of the side of the pan and is spaced therefrom at points below the top. The ring may be formed integral with the pan or may be made from a separate piece and attached thereto either permanently or so as to be readily removed and attached thereto.

To the handle I secure a shield that extends downwardly close to the side of the pan so that when the handle is grasped the shield will be located between the hand and the fire.

In order better and more clearly to describe my invention, I shall have reference to the accompanying drawing in which one embodiment of my invention is shown, and in which.

The same reference characters will be employed to designate the same parts throughout the several views.

Figure 1:
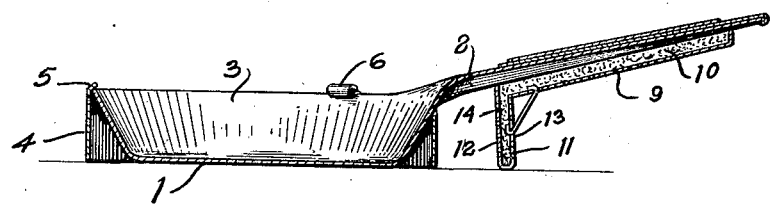
Fig. 1 is a vertical section of my improved frying pan taken on line 1—1, Fig. 2.
Figure 2:
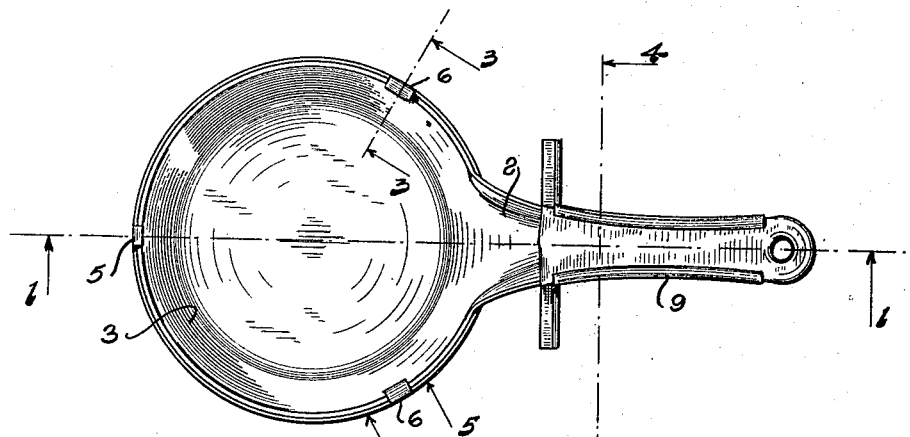
Fig. 2 is a top view of my improved pan.
Figure 3:
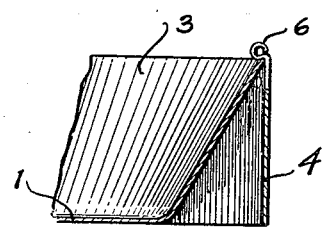
Fig. 3 is a section taken on line 3—3, Fig. 2.
Figure 4:
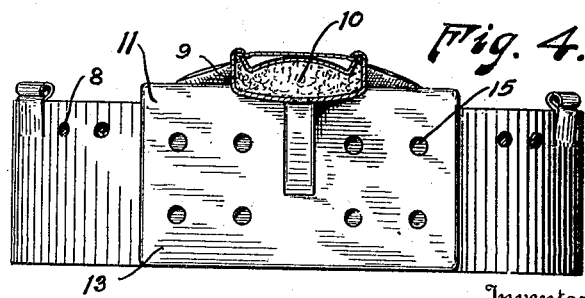
Fig. 4 is a section taken on line 4—4, Fig. 2.
Figure 5:
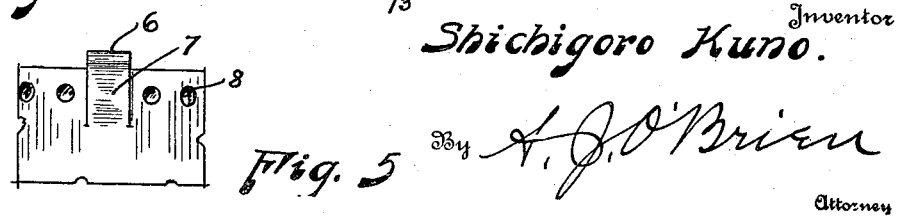
Fig. 5 is a fragmentary side elevation taken on line 5—5, Fig. 2.

Numeral 1 represents a frying pan of ordinary construction, which may be pressed from sheet steel or made of cast metal and is provided with a handle 2. The pan has an upwardly inclined side 3 in the usual manner. Secured to the pan is a ring 4, which is preferably constructed of sheet metal. This ring has an inside diameter that is substantially equal to the outside diameter of the upper edge of the pan. The upper edge of the ring has a hook 5 that extends inwardly and is adapted to project over and engage the upper edge of the pan in the manner shown in Figs. 1 and 2. Spaced about 120 degrees from the hook 5 are hooks 6 which are formed from the upper end of a tongue 7, which is integral with the material of the ring, but cut therefrom along the sides in the manner shown in Fig. 5. The upper ends of the hooks are curved so that they can readily be grasped by the fingers and bent outwardly a sufficient distance to permit the ring to be detached from the pan. In this manner the ring can be attached to any one of a number of different pans and can be removed so as to permit the pans to be cleaned. When the sides of the pan are vertical the ring should be inclined outwardly at the bottom so that there will be a space between the side of the pan and the inner surface of the ring. If desired, the ring may be formed integral with the pan. I prefer to provide the ring with a row of perforations 8 along its upper edge, as otherwise the space between the pan and the ring will become filled with inert gas and the flame will shoot out to the sides of the ring. In order to protect the hand of the cook from becoming burned, I surround the handle with a shield 9 which is separated from the handle by heat insulating material 10, such as asbestos. To the inner end of the shield is secured a downwardly projecting guard 11 which is formed of two layers of metal 12 and 13 separated by a layer 14 of asbestos. The metal sheets 12 and 13 are perforated as indicated by 15 so that the asbestos may be saturated with water if it is found desirable to do so. The shield that is secured to the handle may be made so that it can be removed and used interchangeably on a number of pans if desired, although I consider that a better construction can be obtained where they are non-removable.

From the above it will be apparent that I have produced a frying pan that is economical in the use of gas and which has means for protecting the hands of the cook against injury.

Having now described my invention, what I claim as new is:

In combination with a frying pan having a handle projecting from one side and adapted to rest on the top of a stove, an integral hollow shield and guard both containing insulating material, the guard extending the entire distance from the handle to the stove top and being of sufficient width to protect the hand of the user from hot gases coming from under the pan.

In testimony whereof I affix my signature.

SHICHIGORO KUNO.